United States Patent [19]
Sell

[11] 3,815,343
[45] June 11, 1974

[54] METHOD FOR HARVESTING GRAPES

[75] Inventor: Abdul Harry Sell, Southport, N.C.

[73] Assignee: Darf Corporation, Edenton, N.C.

[22] Filed: Dec. 7, 1972

[21] Appl. No.: 312,934

Related U.S. Application Data

[62] Division of Ser. No. 178,021, Sept. 7, 1971, Pat. No. 3,772,866.

[52] U.S. Cl. ................................ 56/1, 56/DIG. 2
[51] Int. Cl. .................................................. A01d
[58] Field of Search .. 56/330, 1, 328, 327, 126–130

[56] References Cited
UNITED STATES PATENTS

| | | |
|---|---|---|
| 3,184,908 | 5/1965 | Rust .................................. 56/330 |
| 3,325,984 | 6/1967 | Christie et al. ..................... 56/330 |
| 3,439,482 | 4/1969 | Orton ................................. 56/330 |
| 3,473,311 | 10/1969 | Fox .................................... 56/330 |
| 3,636,688 | 1/1972 | Fontan et al ....................... 56/330 |

*Primary Examiner*—Russell R. Kinsey

[57] ABSTRACT

A high chassis vehicle adapted to straddle and travel along a row of plants has a catcher floor divided along its longitudinal center for passing along opposite sides of the plant row. The catcher floor includes two sets of resiliently flexible brushes which are bridged at the central floor division. Vertically reciprocable plant shakers are provided above the floor.

17 Claims, 4 Drawing Figures

METHOD FOR HARVESTING GRAPES

This is a division of application Ser. No. 178,021, filed Sept. 7, 1971 and now U.S. Pat. No. 3,772,866.

This invention relates to a new and useful improvements in harvesters for grapes or the like, and the principal object of the invention is to facilitate the harvesting operation so that the grapes are effectively removed from the plants and are efficiently gathered with minimum losses by falling to the ground.

This object is attained by providing the harvester with improved plant tickling means including horizontal arms which engage a row of plants from opposite sides and are vertically reciprocated for effective removal of grapes from the plants, such arms also being horizontally swingable to facilitate passage thereof along the plant row.

Another important feature of the invention resides in providing the harvester with an improved catcher floor including sets of resiliently flexible, fruit catcher means herein shown as bristles which are preferably so shingled as to efficiently collect the grapes without damaging them and with minimum losses caused by grapes falling to the ground, the catcher floor being slanted so that the grapes gravitate into a collecting conveyor means.

Another important feature of the invention resides in mounting the catcher floor on the harvester vehicle in a floating manner which enables the floor including both sets of fruit catcher means to move laterally to a limited extent when the vehicle deviates from exact centering with respect to a row of plants being harvested.

With the foregoing more important object and features in view and such other objects and features which may become apparent as this specification proceeds, the invention will be understood from the following description taken in conjunction with the accompanying drawings, wherein like characters of reference designate like parts, and wherein.

Figure 1:
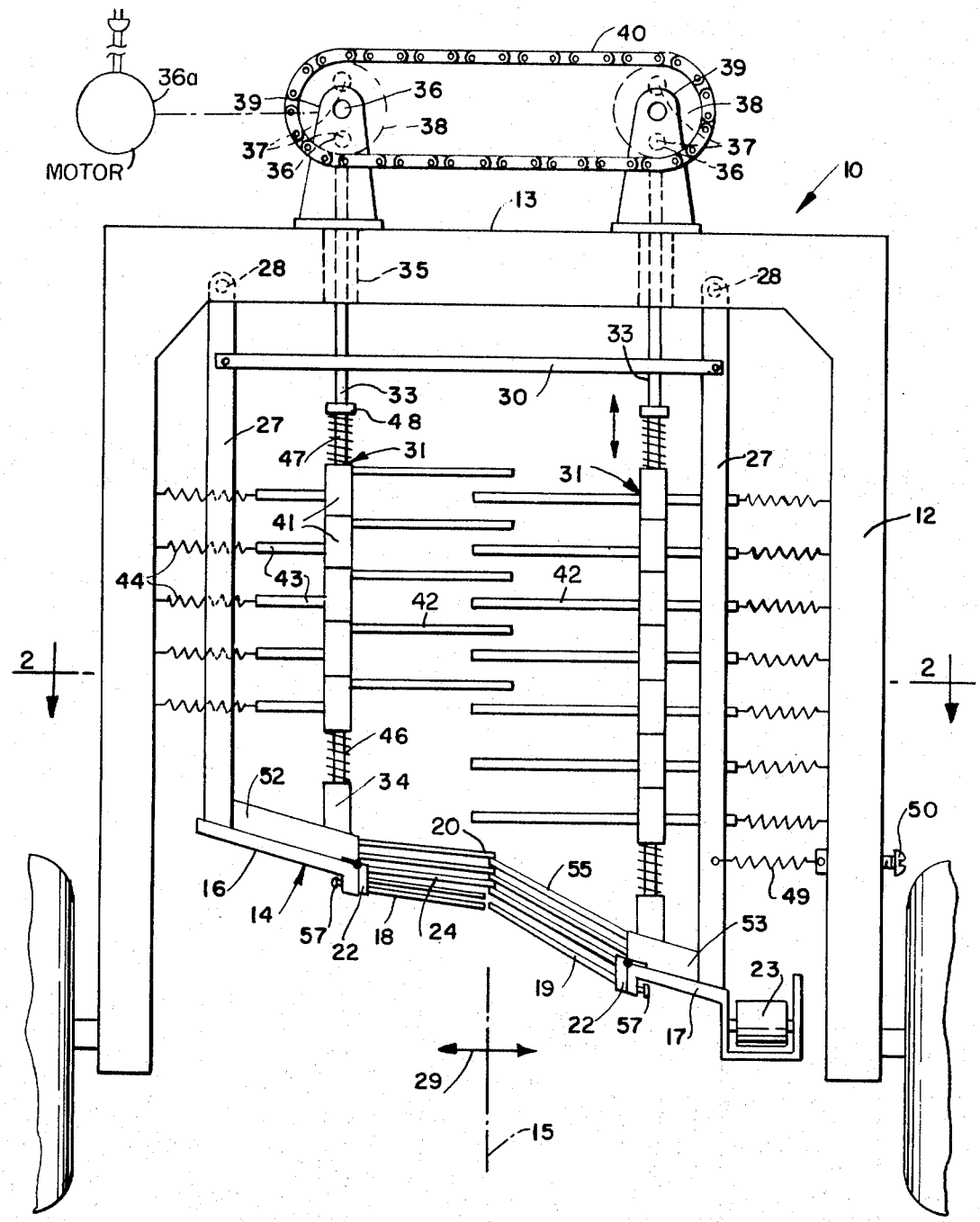
FIG. 1 is a fragmentary rear elevational view of the grape harvester in accordance with the invention.

Referring now to the accompanying drawings in detail, the numeral 10 in FIG. 1 generally designates a grape harvester having the usual high chassis vehicle 12 which is adapted to straddle and travel along a row of plants. The vehicle is provided on its deck 13 with a power plant 36a, steering mechanism, operator's seat, et cetera, all of which are conventional and well known so that illustration thereof in the drawings is unnecessary. The improved catcher floor is designated generally by the numeral 14. It extends transversely from opposite sides of the vehicle toward its longitudinal center indicated at 15, where the floor is divided for passing along opposite sides of the plant row.

The catcher floor comprises a pair of transversely spaced floor boards 16, 17 and two sets of brushed 18, 19 forming fruit catcher means which are mounted on the inner longitudinal edges of the respective floor boards. The brushes extend transversely inwardly from the floor boards and are overlapped at the central floor division, as shown at 20 in FIG. 4.

Figure 3:
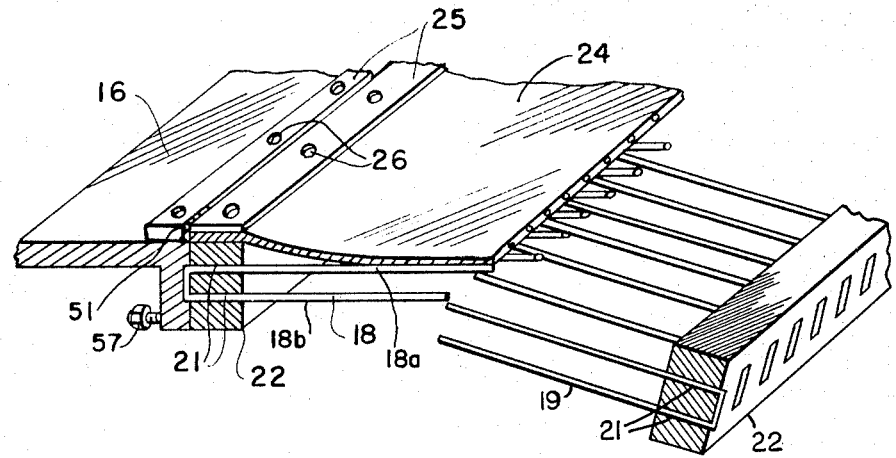
FIG. 3 is a fragmentary, enlarged perspective view of components of the catcher floor.

As will be apparent from FIG. 3, each brush set 18, 19 consists of a row of U-shaped bristles having their bight portions fastened in pairs of apertures 21 formed in a longitudinal mounting member 22, the members 22 of the two brush sets being suitably hinged at 51 to the longitudinal inner edges of the floor boards 16, 17, as already mentioned. The brush bristles are resiliently flexible and are so closely spaced in the set that angular bridging bristles shingle the space formed by the deflection of the bristles as the picker travels along the grape row so that grapes do not fall through them onto the ground.

The upper arm 18a of each U shaped bristle or bristle tuft in the brush 18 is longer than the lower arm 18b in order that the angle of deflection of the upper arm will be greater than the angle of deflection of the lower arm 18b as a vine or post travel through the passage path between the brushes 18 and 19. It is an important feature of this invention that the gap, or V formed by the deflection of the bristles be kept to a minimum. To further this goal the platform members 16 and 17 are vibrated up and down by suitable means, such as the reciprocating arms 33, in order to reduce the drag upon the bristles by the grape vine trunks or posts passing between the bristles. The reduction of the drag increases the speed with which the bristle arms return to their normal position and thus the bristles will hug more closely to the vines or posts.

Also the upper brush 18 is angled more closely to the horizontal than the lower brush 19 as seen in FIG. 1. By having the brush 19 at a greater angle than the brush 18, the deflection of the bristles in brush 19 is less than the deflection of bristle in brush 18 and the bristles in brush 19 tend to return to their normal position more rapidly than do the bristles in brush 18. Grapes on the brush 19 will clear the brush 19 and skip into the conveyor 23 more rapidly because of the greater angle of the brush.

The angle of brush sets 18 and 19 about hinges 51 may be adjusted by means of adjusting studs 57 bearing against the members 22.

The bristles of brushes 18 and 19 preferably are relatively stiff but still flexible so that they tend to return to a normal neutral position which is transverse to the longitudinal axis of the picker. Bristles made of polyamide synthetic resins such as nylon have been found to be suitable for this purpose, but other bristles of natural fiber, synthetic fiber, wire, or composite fiber may be used. The brushes 18 and 19 may be formed with tuft of multiple U-shaped bristles, or may be formed with closely spaced single rods or fibers bent in U-shape and fall within the scope of this invention. Alternatively the brushes may be formed with slightly spaced tuft of U-shaped bristles with single fiber bristles interposed.

Figure 2:
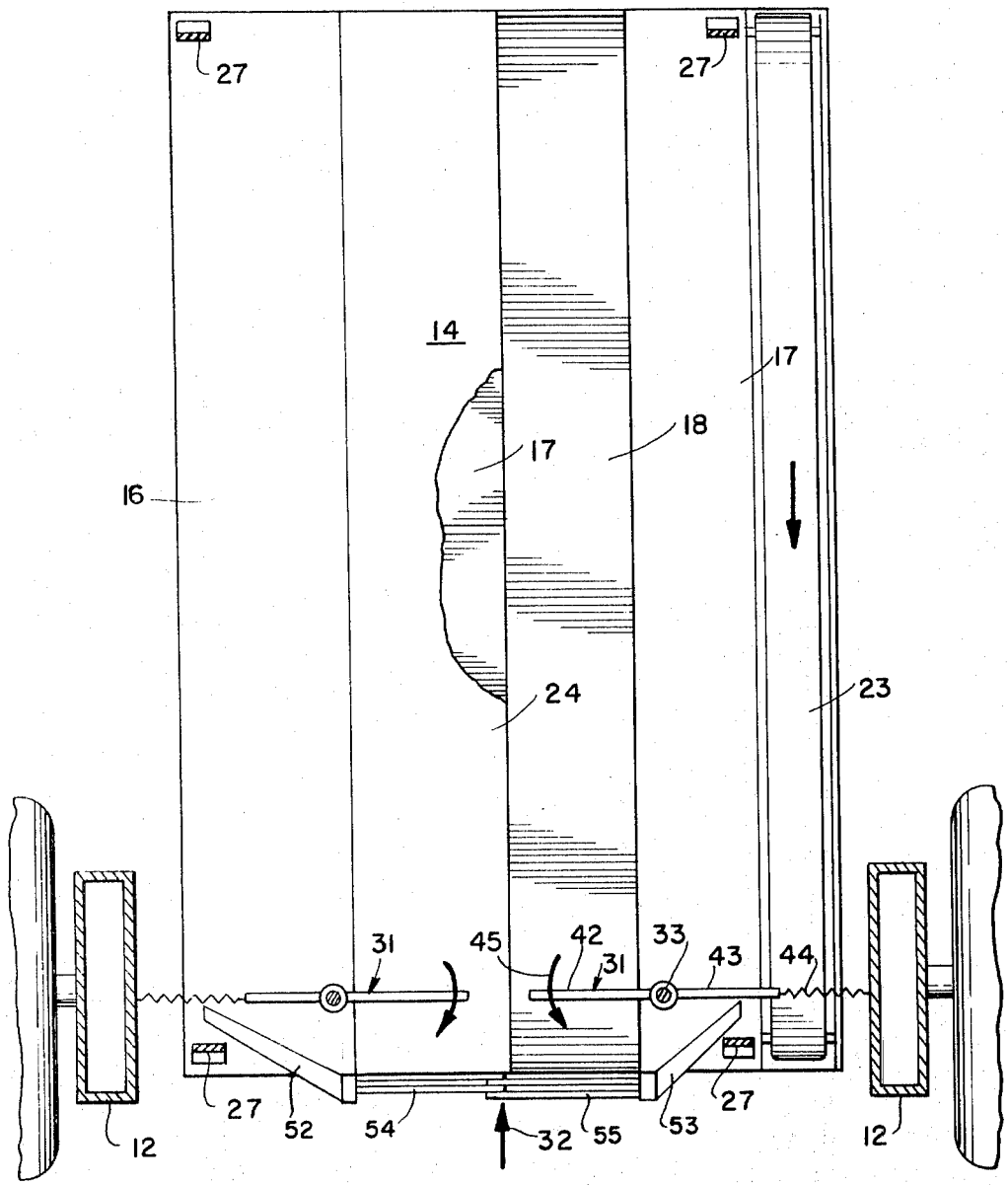
FIG. 2 is a fragmentary horizontal sectional view taken substantially in the plane of the line 2-2 in FIG. 1.

It is desirable to have the vines or posts pass closer to the brush 18 which is provided with the cover 24 (FIGS. 2 and 3) so that there will be less deflection of the bristles of the opposite brush 19. This may be accomplished in several ways. One way is to make the brush 19 of greater density than the brush 18. Another way is to provide a tension spring 49 between the support 27 and the chassis 12 so as to bias the platform 17 slightly to the right.

An adjusting screw 50 is provided in order to vary the spring bias or resistance.

It is the response to this resistance that causes the catcher floor to shift laterally bringing the preselected longtudinal segment of the opposing sets of bridging bristles into alignment with the trunks & post so that they part the bristles along the passage path that will permit the maximum opportunity for hugging or contour tracing of the passing post & trunks by the bristles as they flex for passage by forming a shingeled cavity, detouring fruit loss, that progresses rearwardly around the trunk or post as the harvester advances.

As shown in FIG. 1, the catcher floor 14 is slanted transversely of the vehicle so that the floor board 16 is relatively high and the board 17 is relatively low. The brush set 18 is overlapped on top of the brush set 19 and thus the grapes which fall from the plants gravitate from the high side to the low side of the floor where they drop onto a collecting conveyor 23 which delivers them into an elevator (not shown) extending to the deck 13 of the vehicle. The upper bristle set 18 is preferably supporting a flexible sheet 24 of plastic, or the like, one longitudinal edge portion of which is hinged by a pair of keeper strips 25 and fasteners 26 to flooring and the mounting member 22 of the brush set 18. The sheet 24 shingles the entire brush set 18, including that portion which overlaps the bristle set 19, and the flexible sheet 24 gives away as the bristle sets are deflected apart by grape plants and posts when the machine travels along the plant row. As this occurs, the free outer edge portion of the sheet 24 turns up and forms a dam which retains grapes collecting on top of the sheet and prevents them from dropping through spaces around the trunk and the posts when the bristles are parted.

When the vine or post has passed and the brush sets come together, the weight of the grapes on top of the sheet 24 causes the turned up edge portion to be disposed flat against the upper brush set, and the grapes roll off the shingling means or bridge 24 onto the lower bristle set 19 and onto the floor board 17, whereupon they drop onto the conveyor 23. The catcher floor 14 is suspended in a floating manner from the deck 13 of the vehicle, as by a set of bars or straps 27 which are connected at their lower end to the floor boards 16, 17 and are pivoted to the deck 13 at their upper end as at 28. The pivots 28 of the straps 27 permit the catcher floor 14 to move laterally to a limited extent as indicated by the arrow 29 in FIG. 1, so that the central division of the floor at the brush set overlap 20 may shift laterally with respect to the longitudinal center 15 of the vehicle when the vehicle deviates laterally from its normal centralized path above the row of plants. The straps 27 are connected together by a tie rod 30 which causes the catcher floor to move as a unit and prevents the high and low side portions of the catcher floor from moving too close together or too far apart, thus assuring that a proper amount of brush overlap is maintained at 20.

Figure 4:
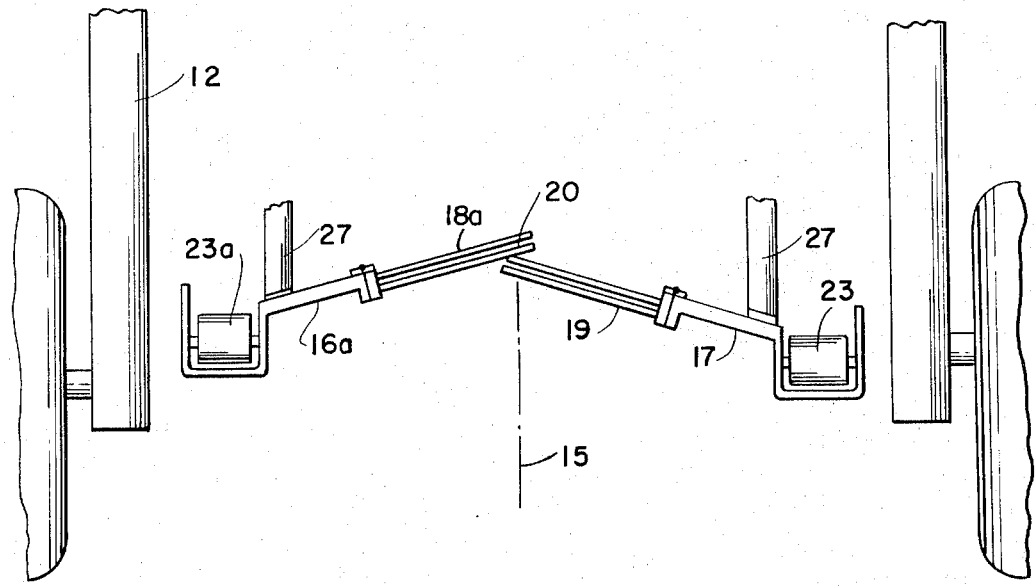
FIG. 4 is a fragmentary front elevational view showing a modified arrangement of the catcher floor.

The catcher floor 14 in FIG. 1 is slanted laterally in one direction and offers the economy of a single conveyor, but a somewhat different arrangement of the floor is shown in FIG. 4 particularly adaptable to low growing or ridge grown fruits such as blueberries without detracting from its efficiency in grapes. Here the brush set 19, the floor board 17 and the conveyor 23 are as before on one side of the center line 15. On the other side the brush set 18a, the floor board 16a and another conveyor 23a are similarly provided and arranged so that the floor has a high region at the center and low regions at both sides. The brush sets 18a, 19 are still bridged as at 20 and grapes falling on the floor skip off laterally in both directions and onto the two conveyors 23, 23a. In this arrangement the use of a brush covering sheet (such as the sheet 24) is obtained by hanging strips of shingeling sheet from spaced top layer bristles as a flag from a staff and it makes no difference whether the brush set 18a overlaps the set 19 as shown, or is hipped as at the peak of a roof for minimum deflection of the bristles as the plant passes there between. As will be apparent the shingling means such as the shingling sheet 24 may be applied to either or both the flexible fruit catcher means or brush sets 18 and 19 in the manner shown in FIGS. 1-3.

As is customary in harvesters of this type, some type of means are provided for shaking the plants so that the grapes fall off onto the catcher floor. The invention provides a pair of improved plant shaker units designated generally as 31, which are located above the catcher floor at opposite sides of the longitudinal center 15 and near the rear end of the machine which travels in the direction of the arrow 32 in FIG. 2.

Each shaker unit 31 comprises a substantially vertical shaft 33, the lower end portion of which is slidably telescoped in a tubular bearing 34 on the catcher floor board (16 or 17), while the upper end portion of the shaft passes freely through an opening 35 in the deck 13 and is connected as at 36 to an eccentrically offset portion 37 of a rotating sprocket 38. The rotating sprockets are journalled in bearings 39 on the deck 13 and are suitably driven, either by a separate motor 36a or by a connecting chain 40 which is driven from the power plant (not shown) of the vehicle.

A plurality of sleeves 41 are rotatably positioned on the shaft 33 and each carries an arm 42 which extends horizontally toward the center of the machine. The several arms 42 are vertically spaced and each of the sleeves 41 is also provided with a shorter, outwardly directed arm 43. A tension spring 44 entends from each arm 43 to the frame of the vehicle and serves to bias the sleeve 41 so that the associated arm 42 normally extends transversely inwardly toward the center line 15. The several sleeves 41, of course, are independently rotatable on the shaft 33, and as the machine travels along the plant row, the arms 42 are individually free to swing horizontally rearwardly as shown at 45 in FIG. 2, against the bais of the springs 44, to facilitate passage of the arms along the plants. As each plant is cleared, the springs 44 return the arms 42 to their normal position. The arms 42 on one side of the centerline of the picker are vertically staggered with respect to the arms 42 on the other side of the centerline and the arms 42 project over the centerline in overlapping relationship.

A compression spring 46 is interposed on the shaft 33 between the lowermost of the sleeves 41 and the bearing 34. Similarly, another such spring 47 is provided between the uppermost sleeve and a collar 48 on the shaft, thus maintaining the several sleeves 41 in end-to-end relation, yet allowing limited movement thereof up or down on the shaft, quite independent of vertical reciprocation which is imparted to the catcher floors with their attached bristles and to the shaft 33 and to all the arms 42 on the shaft when the sprocket 38 is rotated. The vertical reciprocation of the arms 42, touching the grapes, vines and their usual wire supports, causes ripe grapes to fall off the vines onto the catcher floor 14.

It is to be understood that the shaker shafts 33 fit the bearings 34 quite loosely and that the shaft connections 36 to the crankshaft portion 37 are loose enough for the shaper units 31 to become slightly tilted to one side or the other when the catcher floor 14 moves laterally within limits with respect to the center line 15, as already discussed.

Manifestly, instead of the reciprocating means 36, 37, 38, any other suitable mechanism may be used for reciprocating the shafts 33 of the shaker units 31. It will be also understood that such shaker units are provided on the machine having either the catcher floor 14 shown in FIG. 1 or the modified floor shown in FIG. 4. Provided along the rear edges of the platforms 16 and 17 are upright hurdles 52 and 53 of wood or other material which prevent loose grapes on the platform from being dragged off the rear edges by the grapevines. Upright bristle hurdles 54 and 55 are secured to the inner ends of the hurdles 52 and 53 respectively so as to extend across the rear ends of brush sets 18 and 19 respectively. Bristles 54 and 55 are long enough to intermesh or overlap.

Method of Operation

The vines pass between a series of closely spaced self-relieving synchronized arms 42 that travel in a variable diameter orbital direction at a varied frequency that is greater than the natural resonant frequency of the mass of vines, wire and grapes; thus, the energy of the arms 42 is not transmitted down the vine and wire and the grapes are "tickled" from the vines only while within the confines of the machine and in a state of ripeness chosen by the operator. Upon falling from the vine, the grapes are caught upon two platforms 16 and 17 that float to either side to self-align both the platforms and the above described shaking mechanism with any misaligned posts or vines. The space between the two platforms, through which the trunk of the vines and posts pass, is bridged by layered bristles which hug around posts and vines, presenting minimal gap or opening through which the fruit can be lost.

If the size of the fruit and spacing of the bristles approach each other and the fruit has a tendency to lodge in the bristles, a layer of light fabric 24 may be attached to the bristles and as vines and posts pass through the fabric will wrinkle up and form a dam that is self-relieving after the post and vines pass and allow fruit to move uninterrupted to the conveyor.

To facilitate the transference of fruit off the bristles and platforms to the conveyor, vertical energy is conveyed to the platforms 16 and 17 in short pulses that cause the platforms and brushes to vibrate at their natural resonance. This causes the fruit to hop across the platforms and bristles and not to become lodged and pile up in trash or bristles.

It is important that the operator be able to adjust the frequency of vibration of the arms 42 in accordance with the density of the grape vines in order to keep the grapes falling inside of the picker. A greater vibration frequency will be required for dense grape vines than for grape vines less dense. The rate of vibration may be controlled in different ways, one being to control the speed of the sprockets 38. Also the amplitude of vibration may be adjusted by changing the throw of the eccentric offsets 37 to control the extent of vibration of the grape vines. The throw of the eccentric offsets 37 is preferably selected to be at least equal to the distance between the fingers 42 on each shaft 33.

While in the foregoing there have been shown and described the preferred embodiments of the invention, various modifications and equivalents may be resorted to within the spirit and scope of the invention as claimed.

What is claimed as new is:

1. A method of harvesting grapes and like fruit, carried on vines arranged in rows, said vines having trunks supported by posts and having branches supported on trellis wires between said posts; said vines, fruit and trellis wires comprising a series of vine masses each having a natural resonant frequency of vibration, said method comprising passing a harvester vehicle having a longitudinally divided fruit catcher floor in straddling relation to a row of vines with the divided floor defining an intermediate passageway, to permit the vine trunks and posts to pass through said passageway as the harvester advances along said row, with the vine masses, including the fruit, extending above the catcher floor, vibrating said vine mass to remove the fruit therefrom by engaging a power source with a vibratable fruit removal means, adjusting the frequency of vibration of said fruit removal means to a rate greater than the natural resonant frequency of the first vine mass to be engaged by said vibration means as the harvester advances along the vine row and collecting the fruit removed from the vine mass by said fruit removal means upon the fruit catcher floor and vibrating said fruit catcher floor to assist in transferring said fruit to fruit collecting means disposed laterally of said fruit catcher floor, and continuing said vibration as the harvester progresses along the row, with the frequency of vibration of said fruit removal means being adjusted to the natural frequency of each vine mass along the row.

2. A method as defined in claim 1 wherein the fruit removal means are simultaneously vibrated generally upwardly and downwardly with reference to the catcher floor and also transversely of the vine mass as the harvester advances along the vine row.

3. A method as defined in claim 1 wherein the frequency of vibration of the fruit removal means is adjusted in accordance with weight of vine masses as the harvester progresses, being greater for the heavier masses than for the lighter masses.

4. A method as defined in claim 1 wherein the catcher floor includes two sets of shingled flexible fruit catcher means mounted on opposite sides of the floor division and bridging said longitudinal passageway, said method including the step of maintaining a shingled cavity on at least one side of the longitudinal passageway as the harvester advanves along the row of vines, said cavity forming a dam to prevent fruit from falling to the ground due to the deformation of the said flexible fruit catcher means as the portions thereof adjacent said passageway engage vine trunks or support posts.

5. A method of harvesting grapes and like fruit, carried on vines arranged in rows, said vines having trunks supported by posts and having branches supported on trellis wires between said posts; said vines, fruit and trellis wires comprising a vine mass, said method comprising passing a harvester vehicle having a longitudinally divided fruit catcher floor in straddling relation to a row of vines with the divided floor defining an intermediate passageway, to permit the vine trunks and posts to pass through said passageway as the harvester advances along said row, with the vine mass including the fruit extending above the divided catcher floor, vibrating said vine mass to remove the fruit therefrom and simultaneously vibrating said catcher floor to assist in transfer of fruit to collecting means disposed laterally beyond the catcher floor.

6. The method as defined in claim 5 including the step of maintaining a shingled cavity on at least one side of the longitudinal passageway as the harvester advances along the row of vines, said cavity forming a dam to prevent fruit from falling to the ground due to the deformation of the said flexible fruit catcher means as the portions thereof adjacent said passageway engage vine trunks or support posts.

7. A method of harvesting grapes and like fruit, carried on vines arranged in rows, said vines having trunks supported by posts and having branches supported on trellis wires between said posts; said vines, fruit and trellis wires comprising a vine mass, said method comprising passing a harvester vehicle having a laterally deflectable longitudinally divided fruit catcher floor in straddling relation to a row of vines with the divided floor defining an intermediate passageway, to permit the vine trunks and posts to pass through said passageway as the harvester advances along said row, with the vine mass including the fruit extending above the catcher floor, vibrating said vine mass to remove the fruit therefrom, collecting said fruit on said divided floor and vibrating said floor to assist in transferring fruit to collecting means disposed laterally beyond said floor.

8. A method as defined in claim 7 which includes the step of laterally deflecting the longitudinal floor as a unit by contact of the vine trunks and posts with portions of said divided floor adjacent the intermediate passageway.

9. A method as defined in claim 8 wherein the divided floor comprises two sets of shingled, flexible fruit catching means and the method includes the step of forming a shingled cavity in at least one of said sets of shingled flexible fruit catcher means by contact of said means with the vine trunks and posts to provide a dam to prevent fruit from falling to the ground through said passageway as the divided catcher floor engages said trunks and posts.

10. In a method of harvesting grapes and the like wherein a mobile harvester vehicle is passd in straddling relation to a row of vines including fruit bearing masses and fruit is shaken from the vines onto a divided floor which is provided with an intermediate passageway for vine trunks and posts and with two sets of fruit catching members arranged one on one side and the other on the other side of the intermediate passageway and normally bridging said passageway, the step which comprises forming a dam on one of said fruit catching means in passing a vine trunk or post, to prevent fruit from dropping to the ground around said trunk or post and thereafter removing the dam to permit fruit to pass laterally over said passageway to fruit collecting means located at the side of catcher floor remote from the dam.

11. In a method of harvesting grapes and the like wherein a fruit harvester having a divided catcher floor with an intermediate opening forming a passageway to permit passage of trunks and posts, passes in straddling relation to a vine row, which catcher floor is provided with two sets of flexible fruit catcher means one mounted on one side and the other on the other side of the passageway and bridging said passageway, the step which comprises vibrating the catcher floor to assist in transferring fruit across the central passageway to fruit collecting means located laterally beyond said floor.

12. In a method of mechanically harvesting grapes and the like wherein a mobile vehicle having a divided floor provided with an intermediate passageway is passed in straddling relation to a row of fruit bearing means, the steps which comprise subjecting said vines to vibration both up and down and laterally with respect to the catcher floor and passing said fruit to collecting means disposed laterally along one side only of the catcher floor.

13. In a method of mechanically harvesting grapes and the like wherein a mobile vehicle having a divided floor provided with an intermediate passageway is passed in straddling relation to a row of vines having a series of fruit bearing masses of different weights disposed longitudinally along the row which method includes the steps of subjecting each of said masses to resonant vibration as the harvester passes the same varying the frequency of vibration in accordance with the weight of said fruit bearing masses, the frequency being greater for heavy masses and less for lighter masses, collecting the fruit on the catcher floor and thereafter removing said fruit from the catcher floor and passing the same to laterally disposed collecting means disposed at one side only of the catcher floor.

14. In a method of harvesting grapes and the like wherein a mobile harvester vehicle is passed in straddling relation to a row of vines, including fruit bearing masses, and fruit is shaken from the vines onto a divided fruit catcher floor which is provided with an intermediate passageway for vine trunks and posts and with two sets of yielding fruit catching members arranged one on one side and the other on the other side of the intermediate passageway and normally bridging said passageway, the steps which comprise providing means on one of said fruit catching means, to prevent fruit from dropping to the ground around a trunk or post, as the harvester vehicle advances along the vine row and passing fruit laterally over said passageway to fruit collecting means at one side only of said fruit catcher floor.

15. In a method of mechanically harvesting grapes and the like wherein a mobile vehicle having a divided fruit catcher floor provided with an intermediate passageway is passed in straddling relation to a row of fruit bearing means, the steps which comprise subjecting said vines to vibration as the harvester advances along the row to cause the fruit to drop to the catcher floor and passing said fruit to collecting means disposed laterally beyond the catcher floor disposed at one side only of the catcher floor.

16. In a method of harvesting grapes and the like wherein a mobile harvester vehicle is passed in straddling relation to a row of vines, including fruit bearing masses, and fruit is removed from the vines and deposited onto a divided fruit catcher floor which is provided with an intermediate passageway for vine trunks and posts and with two sets of yielding fruit catching members arranged one on one side and the other on the other side of the intermediate passageway and normally bridging said passageway, the steps which comprise providing means on one of said fruit cathing means, to prevent fruit from dropping to the ground around a trunk or post, as the harvester vehicle advances along the vine row and passing fruit laterally over said passageway to fruit collecting means at one side only of said fruit catcher floor.

17. In a method of mechanically harvesting grapes and the like wherein a mobile vehicle having a divided fruit catcher floor provided with an intermediate passageway is passed in straddling relation to a row of fruit bearing vines, the steps which comprise removing substantially all of the fruit from said vines as the harvester advances along the row, depositing fruit onto the catcher floor and passing said fruit to collecting means disposed laterally beyond the catcher floor at one side only of the catcher floor.

* * * * *